United States Patent [19]
Maringer

[11] 3,816,781
[45] June 11, 1974

[54] CIRCUIT FOR CORRECTING THE INFLUENCE OF VELOCITY ON AN INDUCTIVE POSITION TRANSDUCER

[75] Inventor: Albert Maringer, Karlsruhe, Germany

[73] Assignee: Siemens Aktiengesellschaft, Munchen, Germany

[22] Filed: Apr. 24, 1973

[21] Appl. No.: 353,996

[30] Foreign Application Priority Data
Apr. 28, 1972 Germany............................ 2221095

[52] U.S. Cl..... 310/68 R, 123/148 E, 123/146.5 A, 307/265, 310/168, 318/632
[51] Int. Cl. .......................................... H03k 11/00
[58] Field of Search ...... 307/261, 268, 265; 328/58, 328/231; 324/107; 340/195, 199; 318/632; 123/32 EA, 148 E, 149 A, 146.5 A; 310/68 R, 168

[56] References Cited
UNITED STATES PATENTS
3,473,061 10/1969 Soehner et al...................... 310/168
3,531,659 9/1970 McAvoy............................. 307/265
3,553,593 1/1971 Gedance............................ 307/265

Primary Examiner—William M. Shoop, Jr.
Assistant Examiner—Harry E. Moose, Jr.
Attorney, Agent, or Firm—Kenyon & Kenyon Reilly Carr & Chapin

[57] ABSTRACT

A circuit for correcting the influence of velocity on the output signal of an inductive position transmitter of the type which comprises an armature moving relative to a sensor having an excitation winding, in which a trigger transistor is arranged to fire at a predetermined percentage of the maximum output voltage of the sensor and to turn off at another predetermined point to provide an output which is indicative of the zero crossing point of the armature and sensor.

11 Claims, 2 Drawing Figures

CIRCUIT FOR CORRECTING THE INFLUENCE OF VELOCITY ON AN INDUCTIVE POSITION TRANSDUCER

BACKGROUND OF THE INVENTION

This invention relates to position transmitters in general and more particularly to a circuit for correcting for the velocity influence in a position transmitter. The position of a movable machine part with respect to a stationary part can be determined through the use of an inductively coupled position transmitter. In such a system, an excitation winding is wound on a magnetic frame attached to the stationary part and a soft steel armature is attached to the moving machine part so as to come in close proximity with the excitation winding, i.e., there will be a small air gap between the armature and the excitation winding as the armature passes the winding. When using, for example, a symmetrical magnetic frame with a three leg core, a sinusoidal voltage variation will be generated when the armature moves past the air gap with the zero crossing of the voltage corresponding to the symmetrical position of the armature in front of the air gap. The coincidence of the zero crossing point and this position of the armature only occurs, however, at relatively low speeds. As velocity increases, a lag in the output voltage of the excitation winding results due to inductance in the system, i.e., the zero crossing does not occur until after the armature is past the position opposite the air gap. This leads to an incorrect position indication which is dependent upon velocity. Such errors are not tolerable in many application such as when the position transmitter is used as a dead center point transmitter in an internal combustion engine. Thus, there is a need to provide a correction for this lag if such a transmitter is to be used in applications where accuracy is essential.

SUMMARY OF THE INVENTION

The present invention provides a correction circuit which will cancel out the velocity dependent error which results in such a position transmitter. The output of the excitation winding of the position transmitter is coupled to a trigger transistor which is set to fire or turn on at a first predetermined level during the upswing of a sinusoidal pulse output and to turn off at a second level on the falling portion of the pulse. The turn on point is determined by the voltage at the tap of a voltage divider which has across it the peak value of the previous pulse. This turn on always occurs at the same percentage of peak voltage. The turn off point is made variable with respect to time through an RC circuit which is switched into parallel with one portion of the voltage divider at turn on. The voltage at which turn off is to occur decreases exponentially due to the RC circuit so as to vary the point at which turn off occurs as a function of speed. An output is then provided at the time of turn off or resetting of the trigger transistor which accurately reflects the true symmetrical position of the armature opposite the air gap.

DETAILED DESCRIPTION OF THE PREFERRED EMBODIMENT

Figure 1:
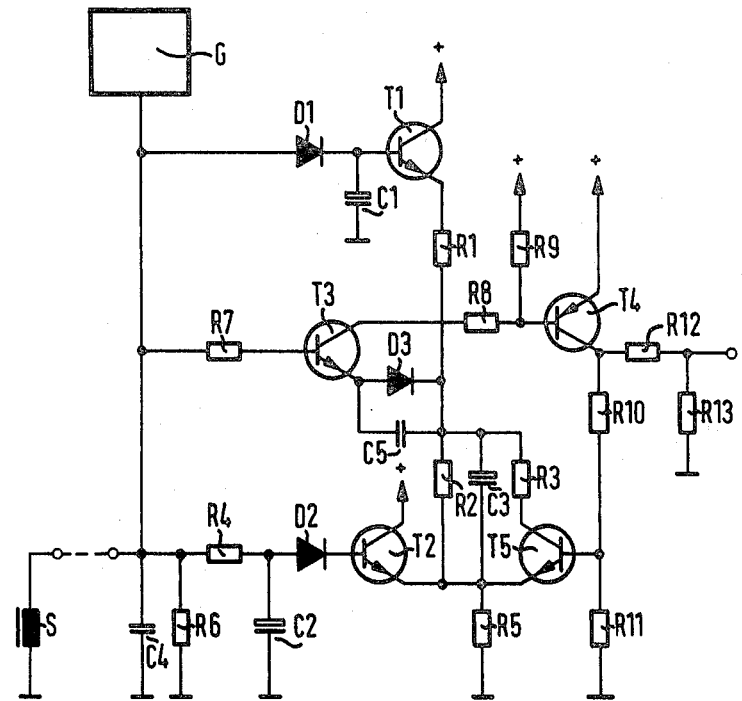
FIG. 1 is a circuit diagram of the preferred embodiment of the correction circuit of the present invention.

FIG. 1 is a circuit diagram of a preferred embodiment of the present invention. As shown thereon, the excitation winding S of a magnetic frame, not further shown or described, is coupled to the output of a generator G which supplies it with a constant DC current. At the end of the winding S, a voltage is picked off which comprises a DC component and an AC component generated when the armature moves past the air gap of the magnetic frame. This voltage is first fed to a capacitor C4 and Resistor R6 in parallel between the sensor S and ground. This permits the pickup line from sensor S to be terminated in a low impedance. The capacitor C4 filters out any interference pulses. From here the voltage is also provided through a diode D1 to a storage capacitor C1. Capacitor C1 is coupled to the base of a transistor T1 which has a positive input voltage at its collector and its emitter connected through a voltage divider comprising resistors R1, R2, and R5 to ground. The voltage from sensor S is also connected through a resistor R7 to the base of a trigger transistor T3. Transistor T3 has its emitter coupled through a diode D3 to the junction of resistors R1 and R2 of the voltage divider. A capacitor C5 is shunted across the diode D3. At the junction of resistors R2 and R5, the emitter of a transistor T2 is connected. Transistor T2 has its collector tied to the positive voltage and its base connected to the sensor output through a diode D2 and a low pass filter comprising a resistor R4 and a capacitor C2 to ground. The collector of trigger transistor T3 is coupled through a resistor R8 to the base of an amplifier transistor T4. The transistor T4 has a resistor R9 from its base to a positive voltage and has its emitter also coupled to the positive voltage. The collector of transistor T4 is connected to ground through resistors R10 and R11 in series. The collector is also connected to ground through resistors R12 and R13 from the junction of which the circuit output is taken. The junction of resistors R10 and R11 are connected to the base of a transistor T5 which has its emitter connected to the junction point of R2 and R5 and its collector connected through a resistor R3 to the junction of R1 and R2. A capacitor C3 is placed in parallel across R2.

In operation, the voltage developed at the sensor winding S will comprise a constant DC voltage upon which is impressed an AC sinusoidal voltage which occurs as the armature passes the air gap. The low pass filter comprising resistor R4 and C2 will have a time constant which is large when compared to the duration of the sinusoidal pulses. Thus the voltage at the base of transistor T2 will represent the D.C. component of the sensor output. The diode D2 and the transistor T2 decouple the capacitor C2 from the resistors R5, R1 and R2, which would otherwise load capacitor C2 while providing the D.C. reference voltage at the junction of resistors R2 and R5.

The peak value of the sinusoidal value is held at the storage capacitor C1. C1 will be charged through diode D1 to the peak amplitude of the sinusoidal voltage. The diode D1 prevents the discharge of the capacitor C1 as the sinusoidal voltage decreases from its peak since the polarity of the diode is in the cutoff direction. In place of diode D1 a transistor connected as an emitter follower can also be used. The level at which the trigger transistor responds or turns on is determined by the voltage at the junction between R1 and R2 of the voltage divider. By choosing the resistors R1 and R2 the point on the rising portion of the sinusoidal pulse at which triggering is to occur may be selected. This triggering voltage will be equal to the peak value of the signal multiplied by the ratio of the value of the resistor R2 to the sum of the values of resistors R1 and R2. Since the voltage across the resistors R1 and R2 varies as the peak varies, the triggering point will always be at the same percentage of peak value regardless of any change in the peak value reached by the pulse.

When the voltage at the base of transistor T3 becomes larger than the voltage at the junction of resistors R1 and R2 plus the voltage drop across diode D3, the transistor will conduct. The capacitor C5 which is in parallel across the diode D3 prevents negative feedback which would otherwise be caused by diode D3. When transistor T3 is triggered, the current flow therethrough will cause the voltage at the junctions of resistors R8 and R9 to change turning on transistor T4. Transistor T4 will then provide an output signal through the resistor divider comprising R12 and R13.

The signal which occurs at the time transistor T3 is triggered, however, is not best suited to represent the exact symmetrical position of the armature opposite the air gap of the magnetic frame. Instead, it is preferable to use the signal which occurs when the trigger transistor T3 is reset. The resetting level is variable, with the variations obtained by connecting the resistor R3 in parallel with resistor R2 with transistor T5. Since capacitor C3 is also in parallel with the resistor R2, the resetting level will be determined by the time constant which is obtained from the combination of C3 in parallel with resistors R2 and R3 and in series with resistor R1. Capacitor C3 will initially be charged to the voltage which appears at the junction of resistors R1 and R2. Without C3 in the circuit, as soon as R3 is added in, the voltage, would immediately change. However, with C3 in the circuit, the voltage will change slowly depending upon the time constant mentioned above. At the point where the voltage at the junctions of resistors R1 and R2 becomes equal to the input voltage to transistor T3, the transistor will turn off. This will be at some point on the down slope of sinusoidal pulse. Thus, when transistor T4 turns on and provides an output, it also, through the resistor divider comprising R10 and R11, turns on transistor T5 to place resistor R3 in the circuit. This then provides the varying level at the junction of resistors R1 and R2 which determines the point at which transistor T3 turns off. As mentioned above this will occur at the point where the voltage on the downslope of the sinusoidal pulse equals the voltage at the junction point as determined by the time constant of the circuit. The resetting point may be used to accurately determine the symmetrical position of the armature in front of the air gap of the magnetic frame.

If the system is to only operate for defined velocities between the armature and magnetic frame, the trigger threshold for a given velocity can be pre-set in fixed manner which will accurately define the symmetrical position of the armature in front of the air gap of the magnetic frame by selection of the resistors R1 and R2 making capacitor C3 unnecessary. To handle additional velocity or speeds of rotation, which are predetermined fixed values, transistors T5 may be used to switch in a resistor of proper value to change the voltage for a given velocity. If a plurality of fixed velocities are to be handled then a number of transistors such as T5 may be used to switch in resistors of different values. In operating in this fashion the transistor T5 would then be controlled by a logic circuit which would switch it in as a function of the velocity at which the system was being operated.

Figure 2:
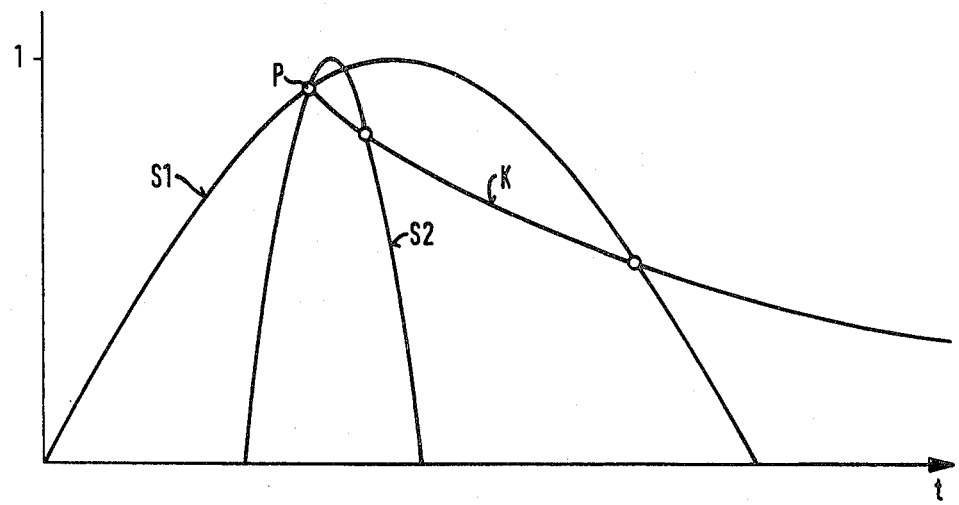
FIG. 2 is a waveform diagram which is helpful in understanding the operation of the circuit of FIG. 1.

A wave form diagram which illustrates the operation of the circuit of FIG. 1 is shown on FIG. 2. Signals resulting from two different rotational speeds are shown with a normalized amplitude value. [Note, that in effect the manner in which the voltage across resistors R1 and R2 is controlled results in a normalization of the peak voltage.] The flatter signal S1 corresponds to a slower speed and the steeper signal S2 to a faster speed. The curves are drawn on top of each other in such a manner that the rising portions intersect at a point P corresponding to the response level set into the trigger transistor T3 through the voltage divider R1 and R2. When the voltage of the sinusoidal pulse reaches the level P, transistor T3 is triggered in the manner described above to turn on transistor T4 which then triggers transistor T5 to place resistor R3 in parallel with resistor R2. Thus, there is also shown on FIG. 2 an exponentially decaying voltage labeled K. This represents the voltage at the junction of resistors R1 and R2. At the start it will be the voltage which is normally obtained from the voltage divider made up of resistors R1 and R2. It will approach a level in an exponential manner determined by the time constant of the circuit described above, which level is the voltage which results from the combination of R1 in series with R2 and R3 in parallel. As shown, the exponential curve K intersects both signal S1 and S2. The signal S2 is intersected at a higher point on its down slope than is S1. This is natural since S2 decreases much more quickly and the charge on the capacitor C3 represented by the curve K has had less time to decay then with the signal S1 which is changing more slowly. This point of intersection which corresponds to the resetting of transistor T3 and a corresponding output from transistor T4, provides the correction required for an exact indication of the position of the armature relative to the air gap at the magnetic frame.

One of the greatest advantages of the present circuit over a fixed trigger is in the relative sensitivity and the relative suppression of interference signals which it provides. In general, a more sensitive position transmitter results in a larger desired signal level but also results in larger interference signal which, for example, may be caused by a mechanical unevenness in the flywheel surface when the circuit is used as the dead center point transmitter of an internal combustion engine. Since the desired and the interference signal are in a fixed ratio to each other, it is possible through adjustments of the trigger threshold in the present circuit to permit only the desired signal to trip the trigger.

Thus a circuit which provides correction for the influence of velocity on an inductive position transmitter has been shown. Although a specific embodiment has been illustrated and described it will be obvious to those skilled in the art that various modifications may be made without departing from the spirit of the invention which is intended to be limited solely by the appended claims.

What is claimed is:

1. A circuit for correcting for the influence of velocity on an inductively coupled position transmitter of the type wherein an armature is moved relative to an excitation winding comprising:
   a. a trigger transistor with its base coupled to the excitation winding and its collector coupled to a voltage source;
   b. means to store the peak value of the excitation winding output; and
   c. a resistor divider coupled to said storage means and the output of said excitation winding and having a tap coupled to the emitter of said trigger transistor.

2. The invention according to claim 1 and further including:
   a. a first capacitor in parallel with at least a portion of said resistor divider; and
   b. means to change the value of a portion of said resistor divider.

3. The invention according to claim 2 wherein said storage means comprises at least a second capacitor coupled between said excitation winding and ground.

4. The invention according to claim 3 wherein said trigger transistor emitter is coupled to said tap through a first diode in parallel with a third capacitor.

5. The invention according to claim 4 wherein said resistor divider comprises at least a first and a second resistor in series, with the junction of said resistors forming said tap.

6. The invention according to claim 5 wherein said first resistor is coupled to the emitter of a second transistor having said second capacitor coupled to its base and said second resistor is coupled to the emitter of a third transistor having its base coupled to the excitation winding.

7. The invention of claim 6 wherein the bases of said second and third transistor are coupled to said excitation winding through respective second and third diodes.

8. The invention according to claim 7 and further including a low pass filter between said excitation winding and said third diode.

9. The invention according to claim 8 and further including;
   a. a third resistor having one end coupled to said voltage divider tap; and
   b. a fourth transistor having its collector coupled to the other side of said third resistor and its emitter coupled to the side of said voltage divider coupled to the excitation winding and its base coupled so as to turn said transistor on in response to said trigger transistor being turned on.

10. The invention according to claim 1 and further including means to change the value of at least a portion of said resistor divider.

11. The invention according to claim 10 wherein said resistor divider comprises at least first and second resistors in series, with their junction being said tap, and said means to change the value comprises at least:
   a. a third resistor having one side coupled to said tap;
   b. a switching transistor having its collector coupled to the other side of said third resistor and its emitter coupled to the side of said second resistor not coupled to said first resistor; and
   c. means coupled to the base of said switching transistor to selectively turn on said transistor.

* * * * *